US012182651B2

(12) United States Patent
Wimmers et al.

(10) Patent No.: US 12,182,651 B2
(45) Date of Patent: Dec. 31, 2024

(54) RFID READ AND WRITE POWER SETTING SYSTEM AND METHOD

(71) Applicant: Avery Dennison Retail Information Services LLC, Mentor, OH (US)

(72) Inventors: David J. Wimmers, Hamilton, OH (US); John D. Mistyurik, Troy, OH (US); Scott P. Fowler, Springsboro, OH (US); Ryan McCoppin, Miamisburg, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 243 days.

(21) Appl. No.: 17/636,498

(22) PCT Filed: Aug. 18, 2020

(86) PCT No.: PCT/US2020/046858
§ 371 (c)(1),
(2) Date: Feb. 18, 2022

(87) PCT Pub. No.: WO2021/034860
PCT Pub. Date: Feb. 25, 2021

(65) Prior Publication Data
US 2022/0300722 A1 Sep. 22, 2022

Related U.S. Application Data

(60) Provisional application No. 62/889,218, filed on Aug. 20, 2019.

(51) Int. Cl.
*G06K 7/10* (2006.01)
*B41J 3/407* (2006.01)
(Continued)

(52) U.S. Cl.
CPC ........ *G06K 7/10217* (2013.01); *B41J 3/4075* (2013.01); *G06K 7/0008* (2013.01);
(Continued)

(58) Field of Classification Search
None
See application file for complete search history.

(56) References Cited

U.S. PATENT DOCUMENTS

| 7,936,252 B2 | 5/2011 | Donato |
| 9,483,670 B2 | 11/2016 | Yamamoto |

(Continued)

FOREIGN PATENT DOCUMENTS

| CN | 101142825 | 3/2008 |
| CN | 105491650 | 4/2016 |

(Continued)

OTHER PUBLICATIONS

International Search Report and Written Opinion dated Oct. 19, 2020 issued in corresponding IA No. PCT/US2020/046858 filed Aug. 18, 2020.

(Continued)

*Primary Examiner* — Thomas S McCormack

(57) ABSTRACT

A system and method for configuring Radio Frequency Identification (RFID) read and write power levels includes an RFID module that generates RF signals, a digital step attenuator that attenuates RF signals, an antenna that transmits attenuated RF signals, and an RF shield that isolates the antenna from an RFID label supply roll. A floor read power is determined by iteratively interrogating an RFID label while decreasing the RF signal power until the label fails to respond to the interrogation. A ceiling read power is determined by iteratively interrogating the RFID label while increasing the RF signal power until multiple labels respond to the interrogation. The read power level is set between the (Continued)

floor read power and the ceiling read power. The write power level is determined by iteratively attempting to program the RFID module while increasing the write power from the read power level until successfully written.

23 Claims, 9 Drawing Sheets

(51) Int. Cl.
*G06K 7/00* (2006.01)
*G06K 19/077* (2006.01)
*H04W 4/80* (2018.01)

(52) U.S. Cl.
CPC .......... *G06K 7/10366* (2013.01); *G06K 19/07773* (2013.01); *H04W 4/80* (2018.02)

(56) References Cited

U.S. PATENT DOCUMENTS

| | | | |
|---|---|---|---|
| 9,569,707 B2 | 2/2017 | Jones et al. | |
| 9,760,749 B2 | 9/2017 | Duckett et al. | |
| 2006/0176152 A1 | 8/2006 | Wagner et al. | |
| 2006/0202800 A1* | 9/2006 | Ohashi | G06K 17/0025 340/10.5 |
| 2006/0214802 A1* | 9/2006 | Posamentier | G06K 19/07327 340/572.1 |
| 2006/0267765 A1* | 11/2006 | Morton | G06K 7/10326 340/572.1 |
| 2008/0186177 A1 | 8/2008 | Nikitin et al. | |
| 2013/0278386 A1 | 10/2013 | Zumsteg | |
| 2014/0210598 A1* | 7/2014 | Mitchell | G06K 7/10158 340/10.5 |
| 2016/0188921 A1 | 6/2016 | Duckett et al. | |
| 2019/0332828 A1* | 10/2019 | Ostri | G06K 7/10128 |
| 2020/0134408 A1* | 4/2020 | Law | B29C 66/83411 |
| 2020/0372450 A1* | 11/2020 | Lickfett | G06K 7/10366 |

FOREIGN PATENT DOCUMENTS

| | | |
|---|---|---|
| CN | 109592320 | 4/2019 |
| EP | 2083378 | 7/2009 |
| EP | 3142047 | 3/2017 |
| WO | 2007/018840 | 2/2007 |

OTHER PUBLICATIONS

International Preliminary Report on Patentability dated Feb. 17, 2022 issued in corresponding IA No. PCT/US2020/046858 filed Aug. 18, 2020.

* cited by examiner

RFID READ AND WRITE POWER SETTING SYSTEM AND METHOD

CROSS-REFERENCE TO RELATED APPLICATIONS

The present application is a 371 of International Application No. PCT/US2020/0046858, which was published in English on Feb. 25, 2021, and claims the benefit of U.S. Provisional Patent Application No. 62/889,218 filed Aug. 20, 2019, both of which are incorporated herein by reference in their entireties.

TECHNICAL FIELD

The subject application generally relates to configuring RFID power levels for communication with RFID tags, and specifically to dynamically determining optimal power settings for RFID printers to read and program individual RFID tags during printing without reading or programming nearby RFID tags.

BACKGROUND

Radio Frequency Identification (RFID) tags typically include an antenna that is coupled to an RFID chip. RFID tags typically receive power from nearby radio frequency sources, such as an RFID reader or RFID printer that is transmitting radio frequency energy at the resonant frequency of the RFID tag. When interrogated by an RFID reader, the RFID tag receives power from the RFID reader and transmits a coded return signal. The RFID reader can also program the RFID tag in a similar fashion.

Some RFID printers can print multiple RFID tags from a supply roll of blank tags. Each RFID tag is generally configured individually at the time the tag is printed. To prevent multiple blanks tags on the supply roll from being accidentally configured when one of the tags is being printed, the RFID write power levels are generally kept low and the supply roll is electrically isolated from the RF antenna of the RFID printer. However, with low power levels it is possible that some RFID tags may not be programmed consistently during printing. Also, different types of RFID tags may have different sensitivities, which can require different write power levels to have to be used for different types of supply rolls of RFID tags.

SUMMARY

In some aspects, embodiments are directed to methods, comprising setting a read power level of an Radio Frequency Identification (RFID) device to an initial power level; determining a floor read power level by iteratively interrogating an RFID label with the RFID device while decreasing the read power level until either the RFID label fails to respond to the interrogation, or the read power level reaches a minimum power level; determining a ceiling read power level by iteratively interrogating the RFID label with the RFID device while increasing the read power level until either a second RFID label responds to the interrogation, or the read power level reaches a maximum power level; and configuring the read power level of the RFID device based at least in part on the floor read power level and the ceiling read power level.

In other aspects, embodiments are directed to apparatuses, comprising a Radio Frequency Identification (RFID) module configured to generate an RF signal; an RF attenuator configured to attenuate the RF signal; an RF antenna configured transmit the attenuated RF signal; and a controller configured to set a read power level of the attenuated RF signal to an initial power level via the RF attenuator, determine a floor read power level by iteratively interrogating an RFID label by the RFID module with the attenuated RF signal while decreasing the read power level via the RF attenuator until either the RFID label fails to respond to the interrogation, or the read power level reaches a minimum power level, determine a ceiling read power level by iteratively interrogating the RFID label by the RFID module with the attenuated RF signal while increasing the read power level until either a second RFID label responds to the interrogation, or the read power level reaches a maximum power level, and configure the read power level of the attenuated RF signal based at least in part on the floor read power level and the ceiling read power level.

Other aspects include, but are not limited to methods for determining read power levels for RFID labels; methods for determining write power levels for RFID labels; RFID antennae and controllers configured to determine read and write power levels for RFID tags; RF shields configured to isolate the RFID antenna from a supply roll of RFID labels; RFID printers configured to determine power levels for interrogating and programming individual RFID labels from a supply roll of RFID labels.

DETAILED DESCRIPTION

The systems and methods disclosed herein are described in detail by way of examples and with reference to FIGS. 1 to 8B. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The present disclosure illustrates new modalities for determining optimal power levels for reading and writing individual RFID chips on RFID printers. The systems and methods disclosed herein describe various aspects of determining and configuring read and write power levels so that only the selected RFID tag is targeted, and other RFID tags, such as an internal supply roll of blank RFID tags are not incidentally written to or read by the RFID device.

RFID devices can operate on different frequency bands are generally designed for different functions and are typically manufactured separately. RFID devices can be used for many different purposes including, for example, item identification, item tracking, and inventory. As can be appreciated, items can include different RFID devices to provide the respective benefits of each of the RFID devices. Different types of RFID devices can have different sensitivities. Certain RFID tags can be reliably interrogated with lower power levels than other types of RFID tags. Certain RFID tags can require higher write power levels than the power level necessary to read the same RFID tags. Still other RFID tags may be able to use a wide range of suitable power levels, while other RFID tags may require power levels to be within a narrower range. Different types of RFID printers may be better than other types at shielding RFID tags that are still on an internal supply roll of blank RFID tags.

RFID printers and RFID readers may need to be configured differently for different types of RFID tags. Instead of manually configuring each RFID printer or RFID reader with each type of supply roll of RFID tags, the present disclosure presents a system and method for determining suitable read and write power levels for writing individual RFID tags without accidentally reading or writing unintended RFID tags, such as blank RFID tags carried internally on a supply roll inside a portable RFID printer.

Figure 1:
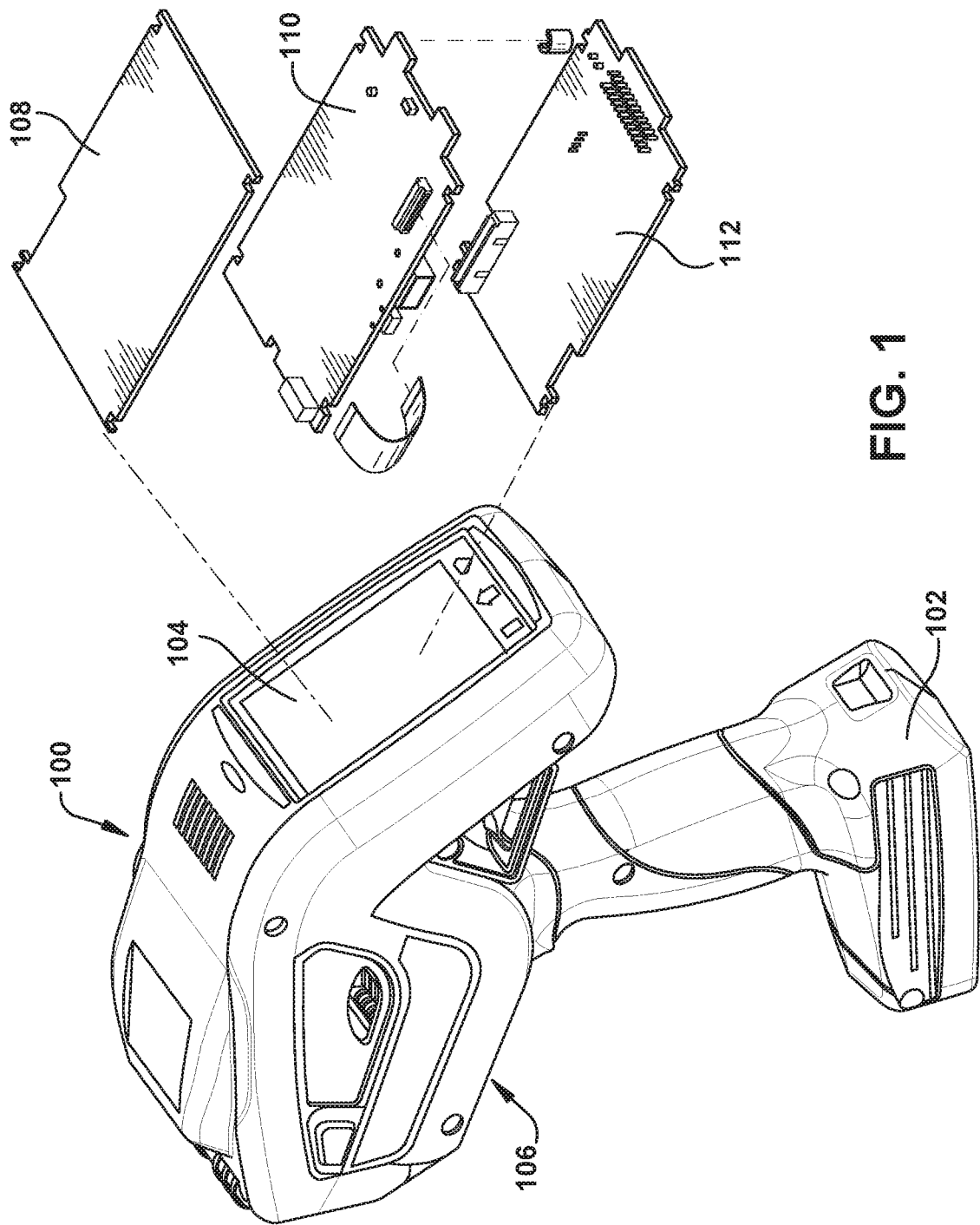
FIG. 1 is a diagram of an example portable RFID printer.

Turning to FIG. 1, a portable RFID printer 100 is presented. The RFID printer 100 includes a power source 102 such as a field replaceable battery or rechargeable battery pack. The RFID printer 100 includes a 106 port through which printed RFID tags emerge from the RFID printer 100. The RFID printer 100 also includes a display screen 104 configured to provide print details and control options to the user. The display screen 104 is driven by a display controller board which can optionally include circuitry for reading and writing RFID chips. The RFID printer can include one or more other circuit boards, which can alternatively include such circuitry, such as a print control board 110, and a print engine board 112. Any suitable circuit boards, controllers, or electronic module assemblies can be used as would be understood in the art. An example portable RFID printer is the 6059 Printer from the Avery Dennison Corporation (Glendale, CA). As can be appreciated however, other RFID printers can alternatively be suitable including non-portable RFID printers.

Figure 2:
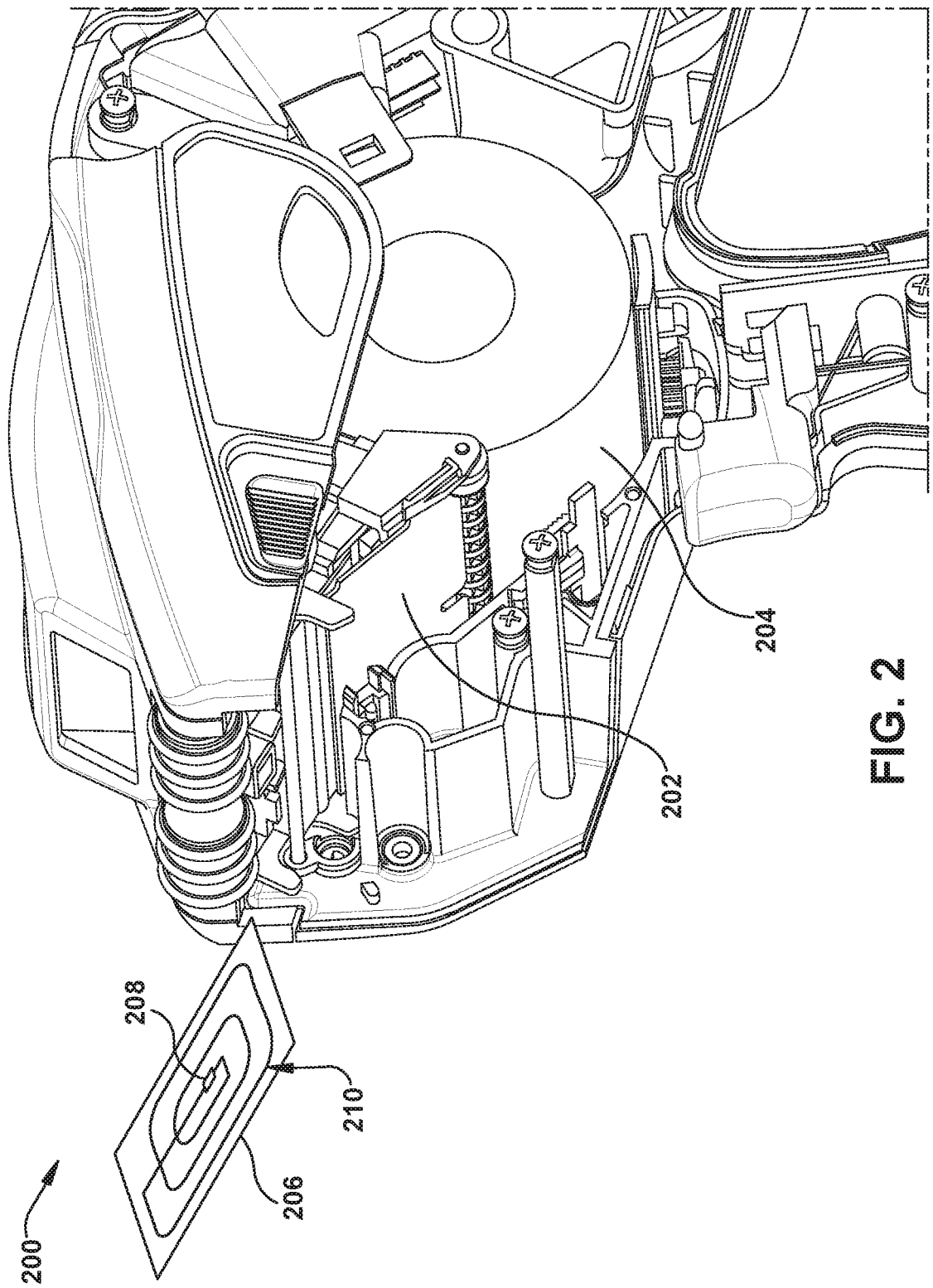
FIG. 2 is a diagram of an example portable RFID printer with an internal RFID antenna for programming individual RFID tags from a supply roll of RFID tags.

Turning now to FIG. 2, an internal view 200 of the portable RFID printer 100 of FIG. 1 is presented. In this internal view 200, an example antenna 202 for programming RFID labels 206 is illustrated. Individual RFID labels 206, also called RFID tags, are printed from a supply roll 204 of labels. Each of the RFID labels 206 includes an RFID chip 208 and an RFID antenna 210 disposed on a suitable substrate, such as plastic substrate, polyethylene terephthalate (PET) substrate, paper or cardboard substrate, polyethylene substrate, etc. The RFID chip 208 is electrically coupled to the RFID antenna 210. The example RFID label 206 illustrated in FIG. 2 uses a coil antenna for the RFID antenna 210. RFID tags using coil antennas generally operate in the high frequency (HF) spectrum, for example at or near 13.56 MHz, and are designed primarily to be driven by a near magnetic field reader such as that incorporated into handheld readers. RFID tags using monopole or dipole antennas can operate in the ultrahigh frequency (UHF) spectrum, for example at 865 MHz to 869 MHz, or 900 MHz to 960 Mhz. Other types of RFID tags can be used as would be understood in the art. The RFID label 206 can include printing (not shown) on one of the sides. Because of the proximity of the supply roll 204 of labels to the antenna 202, it is important to properly control read and write power levels to ensure the antenna 202 only reads or programs the individual RFID label 206 that is proximate to the antenna 202. If power levels are too high, or if the supply roll 204 is not properly isolated from the antenna 202, the antenna 202 can inadvertently read or program multiple RFID labels 206 such as those on the supply roll 204.

Figure 3:
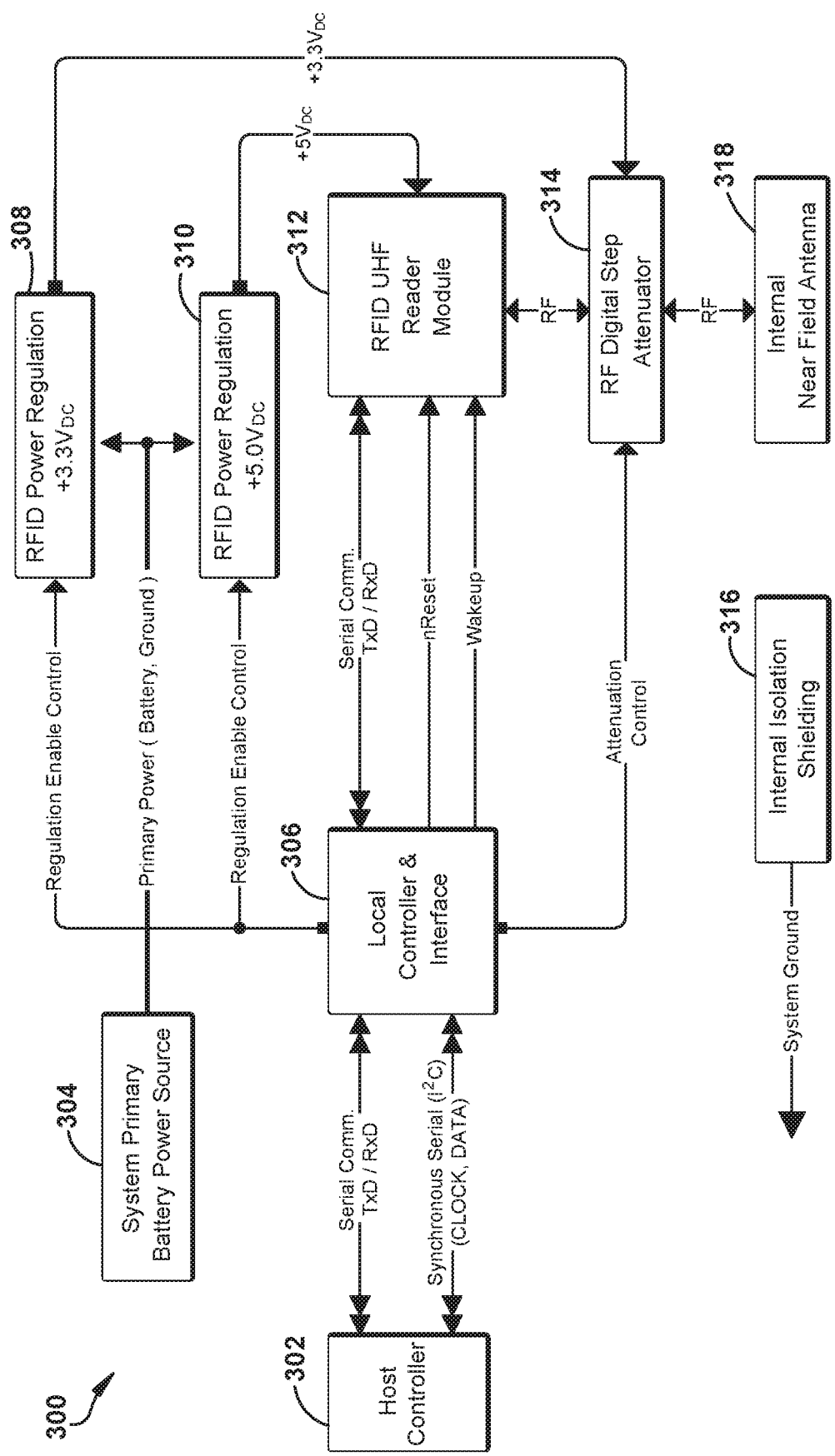
FIG. 3 is a functional diagram of an RFID printer according to an embodiment of the disclosure.

Turning now to FIG. 3, a functional diagram of a first system 300 for controlling read and write power levels in presented. The system 300 can include one or more host controllers 302 that provides data for programming the RFID chips. Example host controllers 302 can include a server, cloud based services, and so forth. A local controller 306 on an RFID printer, such as a portable RFID printer, communicates with the host controller 302, for example when a user operating the portable RFID printer downloads the data to the RFID printer for printing a batch of RFID labels. The power source 304, for example a battery power source as illustrated, provides power to the portable RFID printer. Regulators 308, 310 provide suitable voltages required by the various components of the portable RFID printer. An RFID reader module 312 generates suitable RF signals for reading and writing the RFID chips on RFID labels. An RF Digital Step Attenuator 314, suitably controlled by the local controller 306, modifies the power level of RF signals sent to the antenna 318 so as to prevent the antenna 318 from reading or writing to RFID tags that are not immediately proximate to the antenna 318 as described in greater detail with regard to FIGS. 5A and 5B and the accompanying detailed description. Internal isolation shielding 316 further isolates the RF signals so that read and write operations are only performed with RFID tags that are proximate to the antenna 318. The internal isolation shielding 316 can also shield circuitry from RF energy from the antenna 318.

Figure 4:
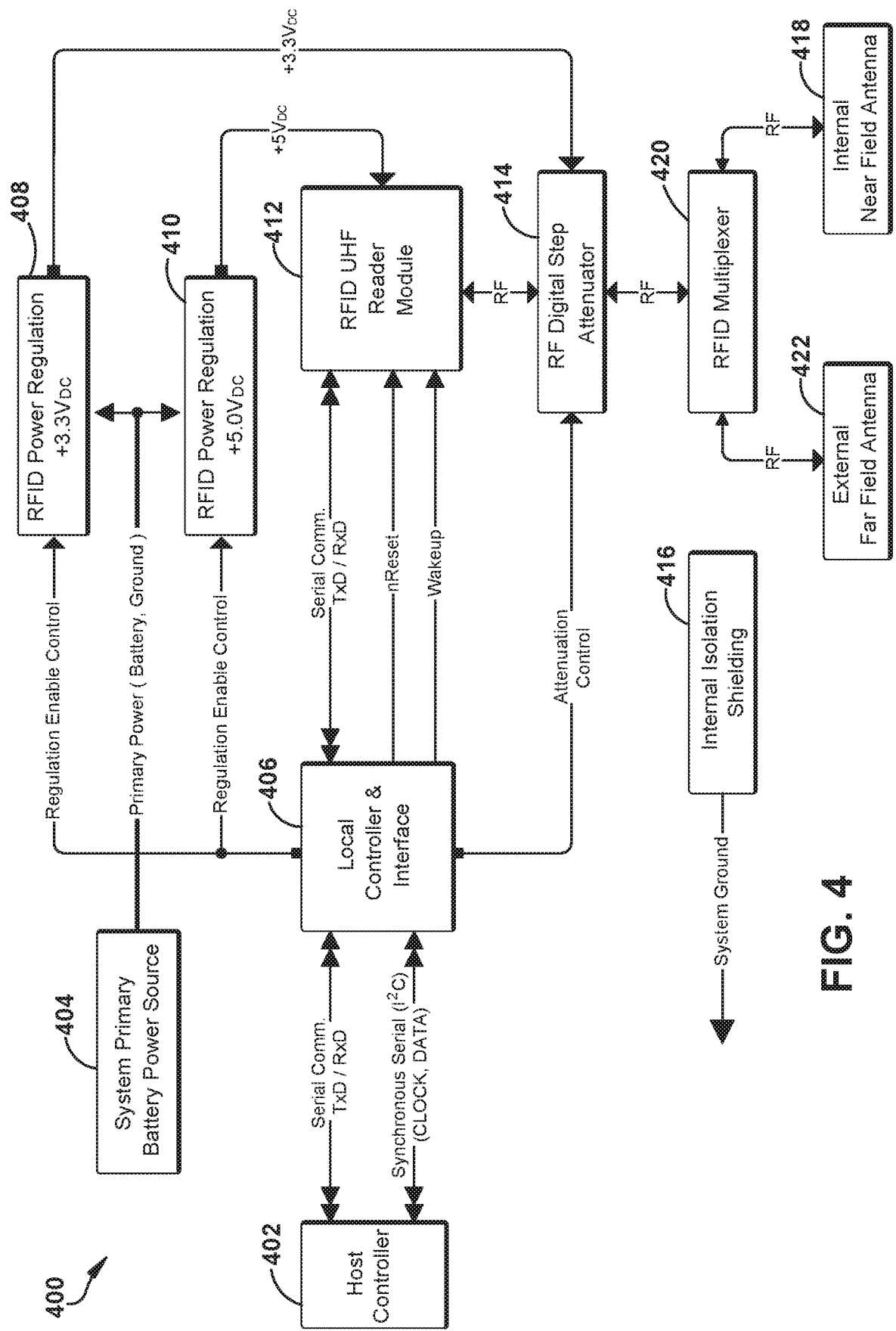
FIG. 4 is a functional diagram of a combination RFID printer and RFID reader according to an embodiment of the disclosure.

Turning now to FIG. 4, a functional diagram of a second system 400 for controlling RFID read and write power levels is presented. The system 400 can include one or more host controllers 402 that provides data for programming the RFID chips. Example host controllers 402 can include a server, cloud based services, and so forth. A local controller 406 on an RFID printer, such as a portable RFID printer, communicates with the host controller 402, for example when a user operating the portable RFID printer downloads the data to the RFID printer for printing a batch of RFID labels. The power source 404, for example a battery power source as illustrated, provides power to the portable RFID printer. Regulators 408, 410 provide suitable voltages required by the various components of the portable RFID printer. An RFID reader module 412 generates suitable RF signals for reading and writing the RFID chips on RFID labels.

Different antennas can be configured on a portable RFID printer. For example, an internal near field antenna 418, such as RFID antenna 210 of FIG. 2, can be used to program RFID tags that are printed by the portable RFID printer. An external far field antenna 422 can be used by the portable RFID printer to interrogate RFID tag outside the portable RFID printer, for example RFID tags attached to merchandise. This configuration allows the portable RFID printer to also be used as an RFID scanner. In embodiments, the portable RFID printer can use the external far field antenna 422 to program or re-program existing RFID tags that may be attached to merchandise or otherwise are not inside the portable RFID printer. An RF Digital Step Attenuator 414, suitably controlled by the local controller 406, modifies the power level of RF signals sent to one or more of the antennas 418, 422 so as to prevent the antennas 418, 422 from reading or writing to RFID tags that are not in proximity to one of the antennas 418, 422 as described in greater detail with regard to FIGS. 5A and 5B and the accompanying detailed description. An RFID multiplexor 420 distributes the RF signals from the RF Digital Step Attenuator 414 to the antennas 418, 422. For example, when programming an RFID tag that is inside the portable RFID printer, the local controller 406 can set the RF Digital Step Attenuator 414 to a first power level, while when configured to scan or program an RFID tag that is external to the portable RFID printer, the local controller 406 can set the RF Digital Step Attenuator 414 to a second power level, for example a higher power level as would typically be the case. Internal isolation shielding 416 further isolates the RF signals so that read and write operations are only performed with RFID tags that are proximate to one or more of the antennas 418, 422. The internal isolation shielding 416 can also shield circuitry from RF energy from the antennas 418, 422.

Figure 5A:
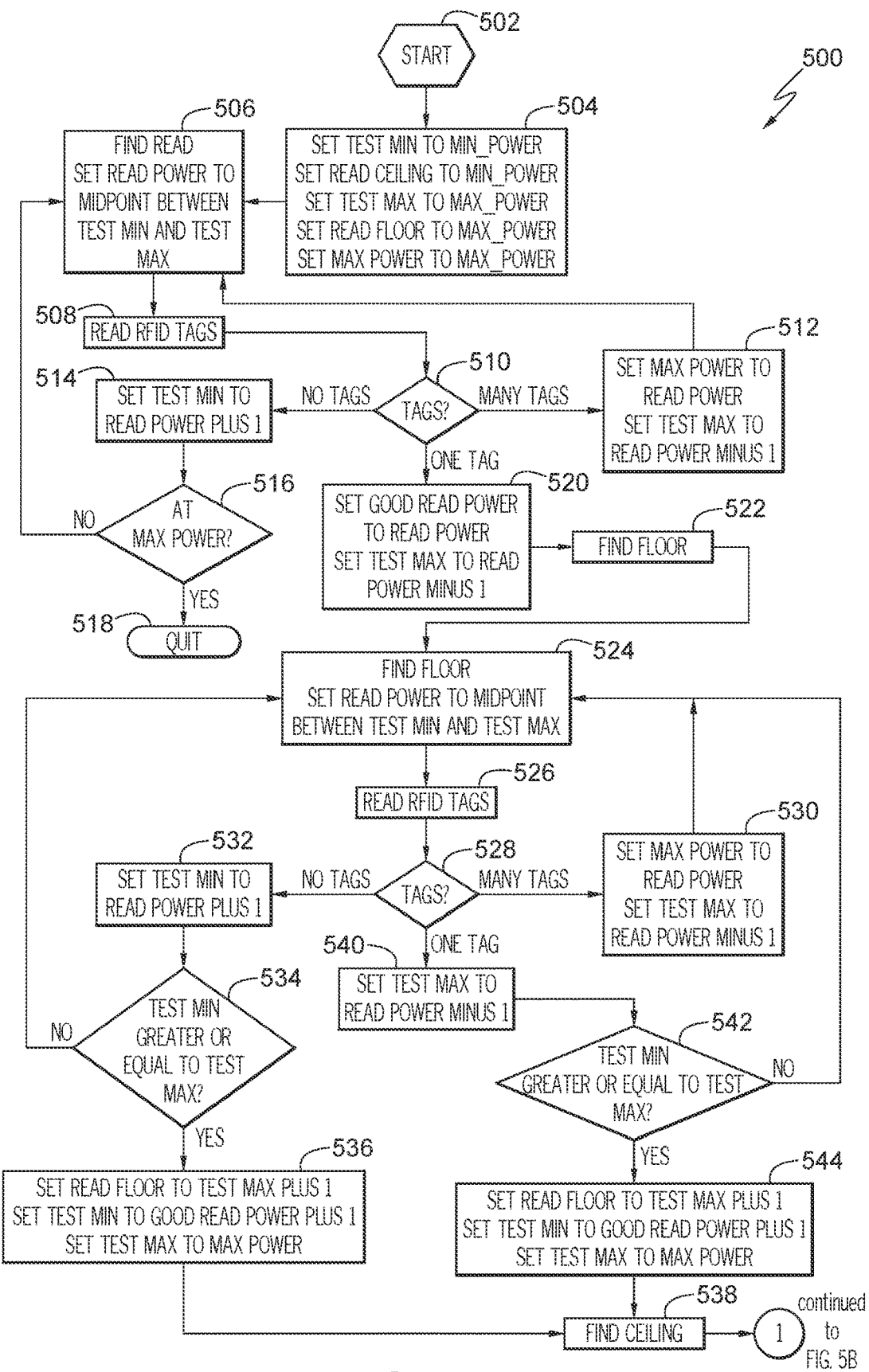
FIGS. 5A and 5B are two parts of a flowchart of example operations of a system for dynamically configuring RFID read and write power levels according to an embodiment of the disclosure.
Figure 5B:
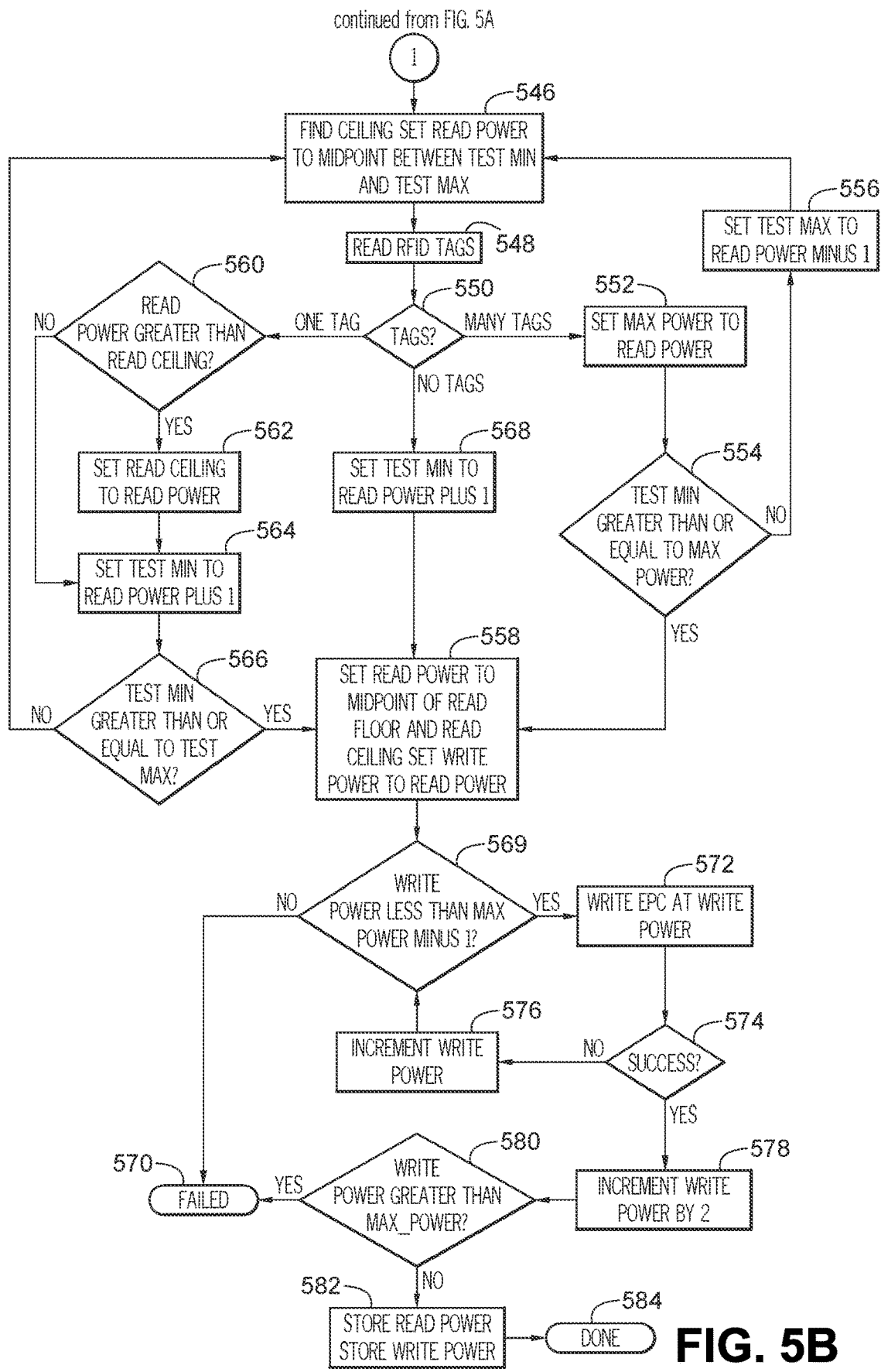

Turning to FIGS. 5A and 5B, a flowchart 500 of example operations of a system for controlling RFID read/write power levels is presented. Operation starts at start block 502 and continues to block 504 where the initial RFID test and read power levels are configured. Progress continues to block 506 where the read is found and the read power is set to the midpoint between the test minimum and the test maximum. Any suitable initial power level can be selected. For example, the initial RFID read power level can be configured to be the midpoint between the minimum configurable read power level and the maximum configurable read power level. The initial minimum and maximum power levels can be hard coded or retrieved from a suitable data store, such as data store. The process continues in block 508 where the system transmits an RFID interrogation signal via the RF antenna of the system, which can be, for example, the internal antenna of the portable RFID printer of FIG. 2. The RFID interrogation signal energizes RFID tags proximate to RF antenna and, based on the read power level and proximity of nearby RFID tags, the system can receive back responses from no RFID tags, a single RFID tag, or multiple (or many) RFID tags.

If at block 510 no RFID tags responded to the RFID interrogation at block 508, then progress is made to block 514 to determine if the read power can be increased by setting the test minimum to read power plus 1. At block 516, if the read power is already at the maximum level, then the process terminates at block 518, otherwise the read power level is incremented by 1 at block 514 and the process continues back to block 506 to perform the RFID interrogation at the increased read power level. The read power level can be incremented at any suitable interval, for example by one dB or by one step available by the RF Digital Step Attenuator of FIG. 4.

If at block 510 one or more RFID tags responded to the RFID interrogation, then progress proceeds to block 512. At block 510, if multiple RFID tags responded to the RFID interrogation, then progress is made to block 512 to determine if the read power can be decreased. The read power is decreased by one at block 512 and the process continues back to blocks 506 and 508 to perform the RFID interrogation at the decreased read power level.

If at block 510 exactly one RFID tag responded, then progress proceeds to block 520 to set the good read power to the read power and to set the test maximum to read power minus 1. At block 520 the read power level is decreased. The read power level can be decreased at any suitable interval, for example by one dB or by one step available by the RF Digital Step Attenuator of FIG. 4. At block 522, the floor read level is determined by checking where one RFID tag will still respond to the RFID interrogation. At block 524 the read power level is set to the midpoint between the test level minimum and test level maximum.

At block 526, the RFID interrogation is performed at the reduced read power level. If at block 528 multiple RFID tag continues to respond, then progress is made back to block 530 to decrease the read power level and perform another RFID interrogation at blocks 526 and 528. Once the RFID tag stops responding to the RFID interrogation at block 528, or if the minimum read level is reached, then at block 528 progress is made to block 532 where the power is increased to the level where the RFID tag last responded to the RFID interrogation and that power level is stored as the floor read level, for example by setting the test level minimum to the read power plus 1. At block 534, if the test level minimum is greater than or equal to the test level maximum, the process returns to block 524. If not, then the process moves to block 536 where the read level floor is set to the test level maximum plus 1, the test level minimum is set to the good read level power plus 1 and the test level maximum is set to the maximum power level. In embodiments, the floor read level can be set at any suitable level where the one RFID tag continues to respond, for example by increasing the read level by two or three dB, or by two or three steps via an associated RF Digital Step Attenuator.

Progress continues to block 540 where the ceiling read level at which the one RFID tag will still respond to the RFID interrogation, but no additional RFID tags will also respond. If at block 542 the test minimum is greater than or equal to the test maximum, then the process returns to block 524. If not, the process moves onto block 544. At block 544 the read power level is increased. At block 544, the read floor level is set to the test level maximum plus 1, the test level minimum is set to the good read power level plus 1 and the test level maximum is set to the maximum power level. The read power level can be increased at any suitable interval, for example by one dB or by one step available by the RF Digital Step Attenuator of FIG. 4.

The ceiling level is determined in block 538 and then in block 546 the read power level is set to the midpoint between test level minimum and the test level maximum. Progress continues to block 548 where the RFID read power level for the system is configured. Any suitable RFID read power level can be selected. For example, the RFID read power level can be configured to be the midpoint between the ceiling read power level and the floor read power level. The RFID read power level can be stored in a suitable data store, such as data store. At block 548, the RFID interrogation is performed at the increased read power level. If at block 550 only one RFID tag continues to respond, then progress is made to block 560 to determine if the read power level is greater than the read ceiling level. If so, at block 562 the read ceiling level is set to the read power level and then at block 564 the test level minimum is set to the read power level plus 1. If not, the process moves to block 564 where the test minimum is increased, for example, by setting to the read power plus 1. At block 566, if the test level minimum is not greater than or equal to the test level maximum then the process moves back to block 546 and if so then the process moves onto block 558, where the read power is set to the midpoint of the floor read level and ceiling read level and set the write power level to the read power level.

At 550, if no tags are detected, the test level minimum is set to the read power plus 1 in block 568 before moving onto block 558, where the read power is set to the midpoint of the floor read level and ceiling read level and set the write power level to the read power level.

Once multiple RFID tags begin to respond to the RFID interrogation at block 550, or if the maximum read level is reached, the maximum power is set to the read power at block 552. If the test minimum is not greater than or equal to the maximum power at block 554, then progress is made to block 556 where the power is decreased (for example, by setting the test maximum to the read power minus 1) to the level where only one RFID tag responded to the previous RFID interrogation and that power level is stored as the ceiling read level. If the test minimum is greater than or equal to the maximum power at block 554, then the process moves to block 558 where the read power is set to the midpoint of the floor read level and ceiling read level and set the write power level to the read power level. In embodiments, the ceiling read level can be set at any suitable level where the one RFID tag continues to respond but other RFID tags do not also respond, for example by decreasing the read level by two or three dB, or by two or three steps via an associated RF Digital Step Attenuator.

If the write power level is less than the maximum power level minus 1 at block 569, then progress continues to block 572 to configure the RFID write power level. If not, then the process terminates at block 570. If the RFID tag write operation at blocks 572 and 574 is not successful, then the write power is incremented at block 576. If the write power is less than the maximum power minus 1, then the process continues back to block 572 to perform the RFID write operation at the RFID write power level. If the RFID tag write operation at blocks 572 and 574 is successful, then at block 578 the write power is increased by 2, for example. The process progresses to block 580 to determine if the write power is greater than the maximum level. If so, the process terminates at block 570. If not, then at block 582 the RFID read power level and/or write power level can be stored in a suitable data store. The process then terminates at block 584.

Figure 6:
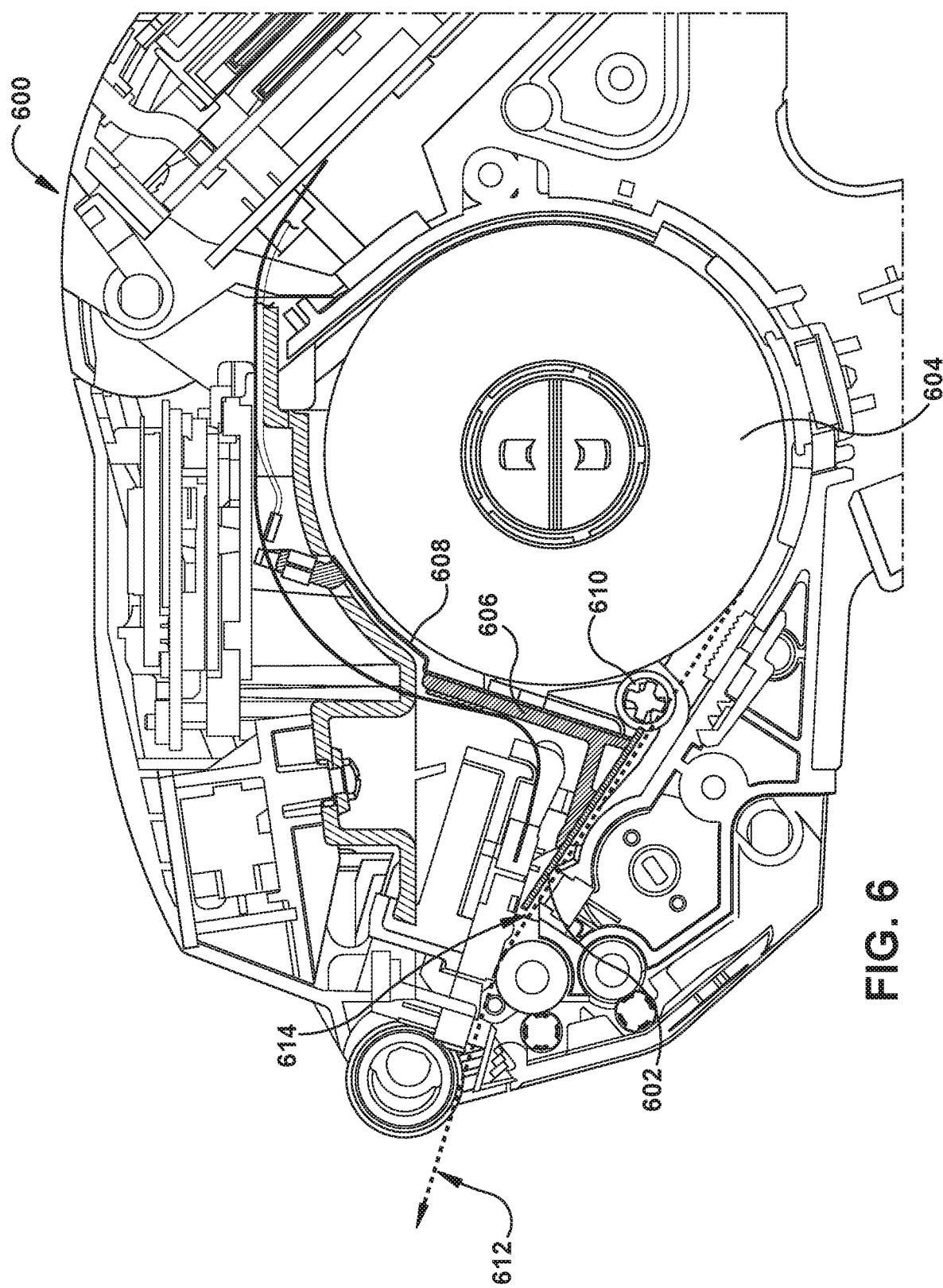
FIG. 6 is a section view of an example portable RFID printer.

Example pseudocode for determining optimal read and write power levels is presented below:

Find a read power that's midway between the lowest power that can see the tag and the highest power that doesn't see more than one tag.
    set testMin to MIN_POWER (-15 dB)
    set readCeiling to MIN_POWER
    set testMax to MAX_POWER (23 dB)
    set readFloor to MAX_POWER
    set maxPower to MAX_POWER
    set state to FIND_READ_STATE
    loop:
        set readPower to the average of testMin and testMax
        read the number of tags currently in the field at the readPower power level
        if one tag read:
            if state equals FIND_READ_STATE:
                set goodReadPower to readPower
                set testMax to goodReadPower minus 1
                set state to FIND_FLOOR_STATE
            else if state equals FIND_FLOOR_STATE:
                set testMax to readPower minus 1
                if testMin is greater than or equal to testMax:
                    set readFloor to testMax plus 1
                    set testMin to goodReadPower plus 1
                    set testMax to maxPower
                    set state to FIND_CEILING_STATE
            else if state equals FIND_CEILING_STATE:
                if readPower is greater than readCeiling
                    set readCeiling to readPower
                set testMin to readPower plus 1
                if testMin is greater than or equal to testMax
                    exit loop
        if no tags read:
            set testMin to readPower plus 1
            if state equals FIND_READ_STATE:
                if testMin is greater than or equal to MAX_POWER minus 1:
                    no tags found, quit algorithm with failure status
            else if state equals FIND_FLOOR_STATE:
                if testMin is greater than or equal to testMax:
                    set readFloor to testMax plus 1
                    set testMin to goodReadPower plus 1
                    set testMax to maxPower
                    set state to FIND_CEILING_STATE
            else if state equals FIND_CEILING_STATE:
                no tags found, quit algorithm with failure status
        if more than one tag read:
            set maxPower to readPower
            if state equals FIND_CEILING_STATE and testMin is greater than or equal to maxPower
                exit loop
            else
                set testMax to readPower minus 1
    repeat loop
Set the Read Power to the Midpoint of the Floor and Ceiling
    set readPower to the average of readFloor and readCeiling
Find the Lowest Write Power that Works, Starting at Read Power
    set writePower to readPower
    loop while writePower is less than MAX_POWER minus 1:
        attempt to write 96-bit EPC at writePower power level
        if successful:
            exit loop
        else
            add one to writePower
            repeat loop
Set Write Power to 2 dB Above Lowest Good Write Power
    add 2 to writePower
    if writePower is greater than MAX_POWER:
        unable to write, quit algorithm with failure status
Return Good Read and Write Powers
    Return readPower and writePower, quit algorithm with success status Referring now to FIG. 6, a section view of an example portable RFID printer 600 is presented. The portable RFID printer 600 includes an RFID antenna board 602, a supply roll 604 of RFID tags, a print head retainer 606, an RF shield 608, and a transfer roller 610 among other parts. A dotted arrow line illustrates the path 612 of the RFID tags through the portable RFID printer 600.

The RFID antenna board 602 acts as an upper supply guide to direct the RFID labels from the supply roll 604 along the path 162 into the print nip 614. The RFID antenna board 602 includes an integral RFID antenna that is used to program the RFID tags as they travel along the path 612 from the supply roll 604 to underneath the RFID antenna board 602 and into the print nip 614.

Due to space restrictions in the portable RFID printer 600, the supply roll 604 of RFID labels is in close proximity to the RFID antenna board 602. The RF shield 608 provides RF shielding to isolates RFID labels on the supply roll 604 so that read and write RFID operations are only performed with RFID labels that are underneath and proximate to the RFID antenna board 602. Along with adjusting the strength of the RFID signals described above, the RF shield 608 helps to ensure that the RFID antenna board 602 does not erroneously couple RF signals to the adjacent RFID labels on the supply roll 604. The RF shield 608 can include a bent but continuous wall that extends across the entire width of the supply roll 604, from the RFID antenna board 602 at the bottom to the top of the cavity for the supply roll 604.

Figure 7:
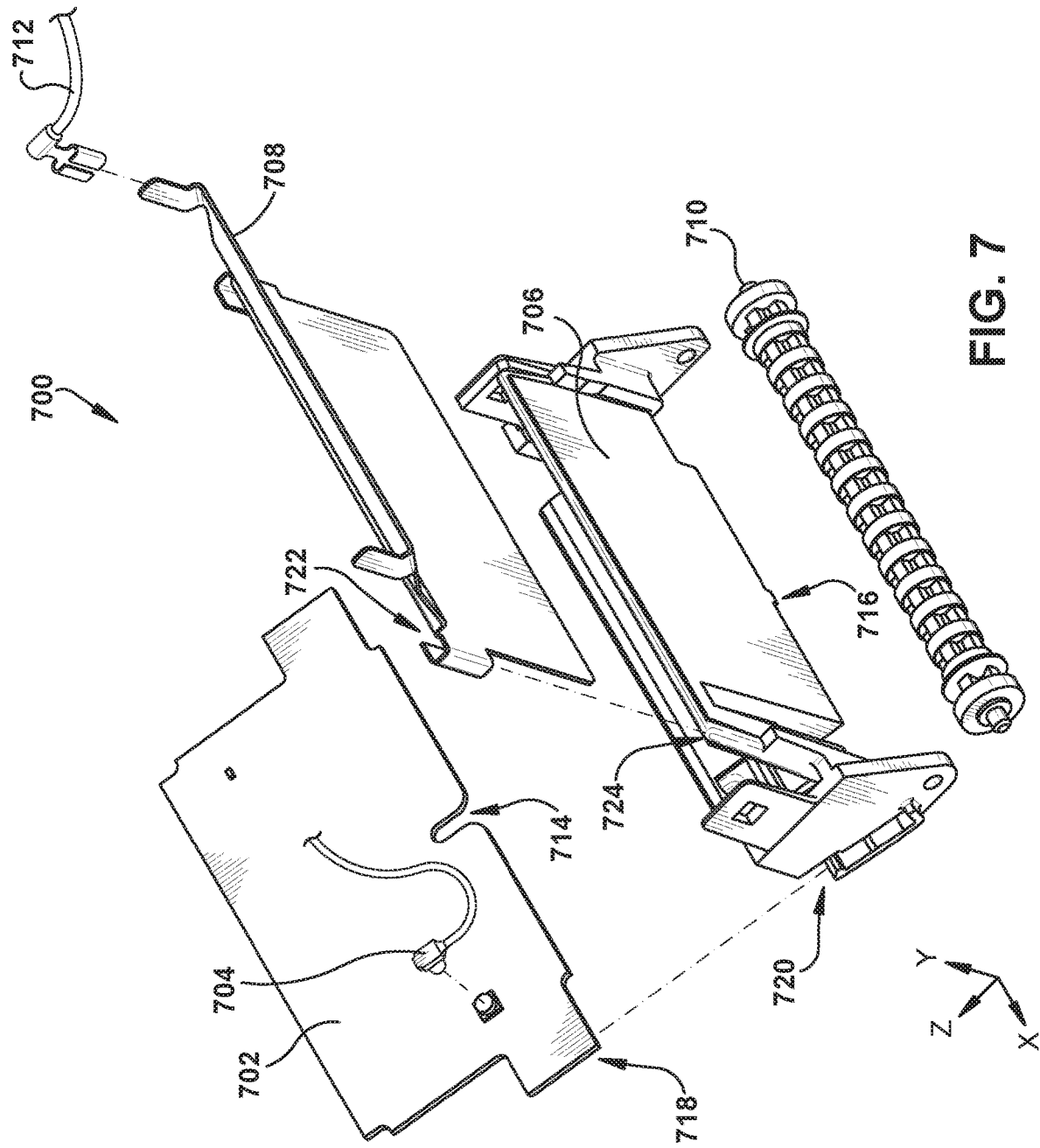
FIG. 7 is a diagram of antenna, print, and shield components of an example portable RFID printer.

Referring also to FIG. 7, selected components 700 of a portable RFID printer are illustrated including an RFID antenna board 702 and an associated RF cable 704, a print head retainer 706, an RF shield 708 and an associated grounding cable 712, and a transfer roller 710. The components 700 includes features configured to facilitate assembly and alignment while also reducing the likelihood of jamming. For example, a notch 714 in the RFID antenna board 702 mates with a locating rib 716 in the print head retainer 706. A wing 718 on each side of the RFID antenna board 702 mates with a retaining pocket 720 of the print head retainer 706. Retaining clips 722 secure the RF shield 708 to the print head retainer 706.

Figure 8A:
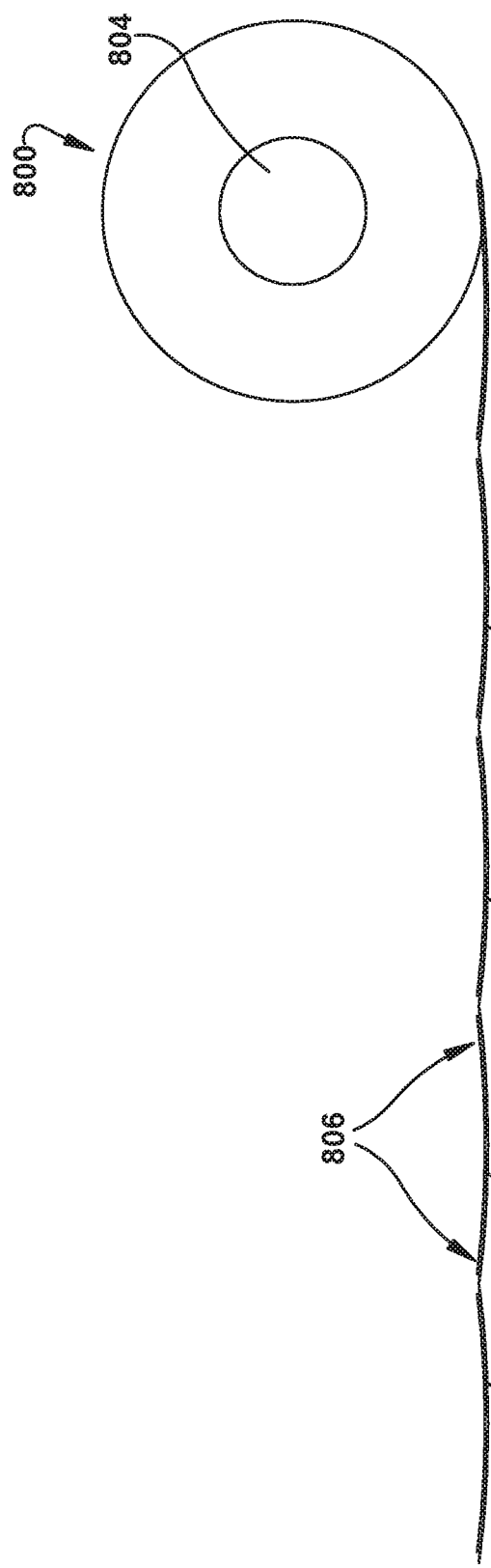
FIG. 8A is a first diagram of RFID tags from a supply roll of RFID tags.
Figure 8B:
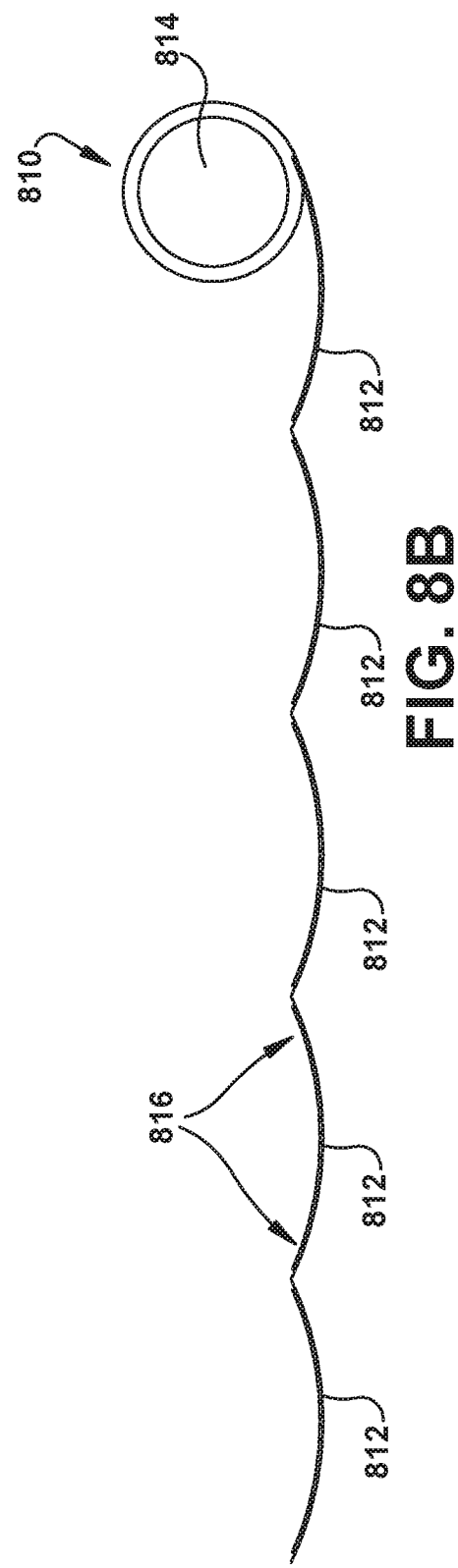
FIG. 8B is a second diagram of RFID tags from a supply roll of RFID tags.

Referring also to FIGS. 8A and 8B, FIG. 8A presents a first diagram 800 of RFID labels 802 from a substantially new supply roll 804 of RFID tags, while FIG. 8B presents a second diagram of RFID tags 814 from a nearly empty supply roll 814 of RFID tags. In FIG. 8A, the RFID labels 802 include a slight scalloping effect 806, while in FIG. 8B, the RFID labels 812 include a substantial scalloping effect 816. The scalloping effect 806, 816 occurs because the supply roll 804, 814 is constructed with internally laminated plastic inlays. The carrier web of RFID labels 802, 812 tends to scallop as the RFID labels 802, 812 unspool off the supply rolls 804, 814. This is due to the memory of curvature that has been induced into the individual butt-cut or die-cut RFID labels 802, 812 while they are wrapped around the core of the supply rolls 804, 814. The scalloping effect 806, 816 can cause the leading edge of one or more of the RFID labels 802, 812 to snag on any feature within the supply path and delaminate from the carrier web, causing jamming.

Referring back to FIG. 7, because the RFID antenna board 702 functions as an upper supply guide that spans the width of the RFID labels. The RFID antenna board 702 directs the RFID labels into the print nip. Any mechanical means of attaching the RFID antenna board 702 to the print head retainer 706, such as countersunk screws, rivets, and so forth would present a protrusion or edge within the supply path that can result in the leading edge of an RFID label snagging, delaminating, and causing a jam. To eliminate protrusions and edges, each side of the RFID antenna board 702 includes a wing 718 that extends outside of the supply path. The wings 718 mate with a corresponding retaining pocket 720 of the print head retainer 706. Similarly, the notch 714 in the RFID antenna board 702 that mates with the locating rib 716 in the print head retainer 706 in an area that is displaced away from the supply path to eliminate the possibility of snagging and jamming.

It will be appreciated that the systems and methods describe herein are also suitable for other machines and processes as would be understood in the art. While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the spirit and scope of the inventions.

What is claimed is:

1. A method, comprising:
   setting a read power level of an Radio Frequency Identification (RFID) device to an initial power level;
   determining a floor read power level by iteratively interrogating an RFID label with the RFID device while decreasing the read power level until either the RFID label fails to respond to the interrogation, or the read power level reaches a minimum power level;
   determining a ceiling read power level by iteratively interrogating the RFID label with the RFID device while increasing the read power level until either a second RFID label responds to the interrogation, or the read power level reaches a maximum power level;
   configuring the read power level of the RFID device based at least in part on the floor read power level and the ceiling read power level;
   setting a write power level of the RFID device to the read power level;
   determining a write power level by iteratively writing to the RFID label, with the RFID device, a coded response to return when interrogated while increasing the write power level for each subsequent write operation after the first, and
   interrogating the RFID label by the RFID device at the read power level, until the RFID label responds to the interrogation with the coded response;
   setting the write power level of the RFID device to the determined write power level;
   reading and writing nearby RFID labels within the RFID device using a near field antenna at a first power level; and
   reading and writing RFID labels positioned outside of the RFID device using a far field antenna at a second power level, wherein the second power level is higher than the first power level.

2. The method of claim 1, wherein the read power level is configured to be approximately the midpoint between floor read power level and the ceiling read power level.

3. The method of claim 1, wherein the initial power level is based at least in part on the minimum power level and the maximum power level.

4. The method of claim 1, wherein the initial power level is approximately the midpoint between the minimum power level and the maximum power level.

5. The method of claim 1, wherein the RFID device is selected from the group consisting of an RFID reader, a handheld RFID reader, an RFID printer, and a handheld RFID printer.

6. The method of claim 1, further comprising:
   printing, by an associated print module, an individual RFID label from a supply roll of RFID labels.

7. The method of claim 1, further comprising:
iteratively interrogating an RFID label, prior to determining the floor read power level, with the RFID device while decreasing the read power level until only the RFID label responds to the interrogation.

8. The method of claim 1, further comprising:
iteratively interrogating an RFID label, prior to determining the floor read power level, with the RFID device while increasing the read power level until the RFID label first responds to the interrogation.

9. The method of claim 1, further comprising:
interrogating the RFID label by the RFID device at the read power level; and
receiving, by the RFID device, a coded response only from the RFID label based on the operation of interrogating the RFID label.

10. An apparatus, comprising:
a Radio Frequency Identification (RFID) module configured to generate an RF signal;
an RF attenuator configured to attenuate the RF signal;
an RF antenna configured transmit the attenuated RF signal; and
a controller configured to:
set a read power level of the attenuated RF signal to an initial power level via the RF attenuator, determine a floor read power level by iteratively interrogating an RFID label by the RFID module with the attenuated RF signal while decreasing the read power level via the RF attenuator until either the RFID label fails to respond to the interrogation, or the read power level reaches a minimum power level,
determine a ceiling read power level by iteratively interrogating the RFID label by the RFID module with the attenuated RF signal while increasing the read power level until either a second RFID label responds to the interrogation, or the read power level reaches a maximum power level, and configure the read power level of the attenuated RF signal based at least in part on the floor read power level and the ceiling read power level;
wherein the controller further configured to:
set a write power level of the attenuated RF signal to the read power level,
determine a write power level by iteratively writing to the RFID label, by the RFID module, a coded response to return when interrogated while increasing the write power level for each subsequent write operation after the first, and
interrogate the RFID label by the RFID module at the read power level, until the RFID label responds to the interrogation with the coded response;
set the write power level of the attenuated RF signal to the determined write power level;

control a near field antenna to read and write nearby RFID labels with the apparatus at a first power level, and
control a far field antenna to read and write RFID labels positioned outside of the apparatus at a second power level, wherein the second power level is higher than the first power level.

11. The apparatus of claim 10, wherein the read power level is configured to be approximately the midpoint between floor read power level and the ceiling read power level.

12. The apparatus of claim 10, wherein the initial power level is based at least in part on the minimum power level and the maximum power level.

13. The apparatus of claim 10, wherein the initial power level is approximately the midpoint between the minimum power level and the maximum power level.

14. The apparatus of claim 10, further comprising:
a print module configured to generate an individual RFID label from a supply roll of RFID labels.

15. The apparatus of claim 10, wherein the near field antenna and the far field antenna are positioned inside the apparatus.

16. The apparatus of claim 10, wherein the controller is further configured to iteratively interrogate the RFID label, by the RFID module, prior to determining the floor read power level, while decreasing the read power level until only the RFID label responds to the interrogation.

17. The apparatus of claim 10, wherein the controller is further configured iteratively interrogate the RFID label, by the RFID module, prior to determining the floor read power level, while increasing the read power level until the RFID label first responds to the interrogation.

18. The apparatus of claim 10, wherein the RF attenuator is a digital step attenuator.

19. The apparatus of claim 10, wherein the RF antenna is configured as an upper supply guide in a supply path between a supply roll of RFID labels and a print nip.

20. The apparatus of claim 19, wherein the RF antenna includes a plurality of wings configured to be outside of the supply path and further configured to secure the RF antenna to an associated print head retainer.

21. The apparatus of claim 20, wherein the plurality of wings are each configured to snap into a pocket of the print head retainer.

22. The apparatus of claim 19, further comprising:
an RF shield configured to isolated the RF antenna from the RFID labels of the supply roll.

23. The apparatus of claim 19, wherein at least a portion of the RF shield is configured to be secured to the upper supply guide.

* * * * *